July 2, 1940.                    G. R. COLEMAN                    2,206,077
                                JOURNAL BEARING
                             Filed March 4, 1936                 2 Sheets-Sheet 1

INVENTOR.
Gilbert R. Coleman
BY Charles B. Rasmussen
ATTORNEYS.

July 2, 1940.　　　　G. R. COLEMAN　　　　2,206,077
JOURNAL BEARING
Filed March 4, 1936　　　　2 Sheets-Sheet 2

INVENTOR.
Gilbert R. Coleman
BY
Charles B. Rasmussen
ATTORNEYS.

Patented July 2, 1940

2,206,077

UNITED STATES PATENT OFFICE 2,206,077

JOURNAL BEARING

Gilbert R. Coleman, Bellevue, N. Y., assignor to William H. Croft, Chicago, Ill.

Application March 4, 1936, Serial No. 67,063

6 Claims. (Cl. 308—79.1)

This invention relates in general to improvements in bearings and, while it has more particular reference to journal bearings used on railway rolling stock, it will be apparent that certain features of the invention have other and more general valuable application.

A principal object of the invention is the provision of means for automatically cooling a journal bearing in the most effective manner.

Another important object of the invention is the provision of tubular conduits extending through such a journal bearing, which conduits serve as passageways for the automatic circulation of lubricating oil from one side of the journal to the other to improve lubrication and reduce friction and wear.

A further object of the invention is the provision of oil circulating means for automatically cooling the tinned or soldered concave lower surface of the brass to which the lining of Babbitt or other suitable material is secured, which surface is most affected by excessive heat.

Another important object of the invention is the provision of means associated with a journal bearing for automatically lubricating the upper surface of the journal exteriorly of and adjacent the bearing.

A further object of the invention is the provision of a journal bearing having oil passageways therein which are formed by separately inserted conduits, which greatly facilitates manufacture and relining of the bearing.

Numerous other objects and advantages of the invention will be apparent as it is better understood from the following description, which, taken in connection with the accompanying drawings, discloses a preferred embodiment thereof.

Figure 1:
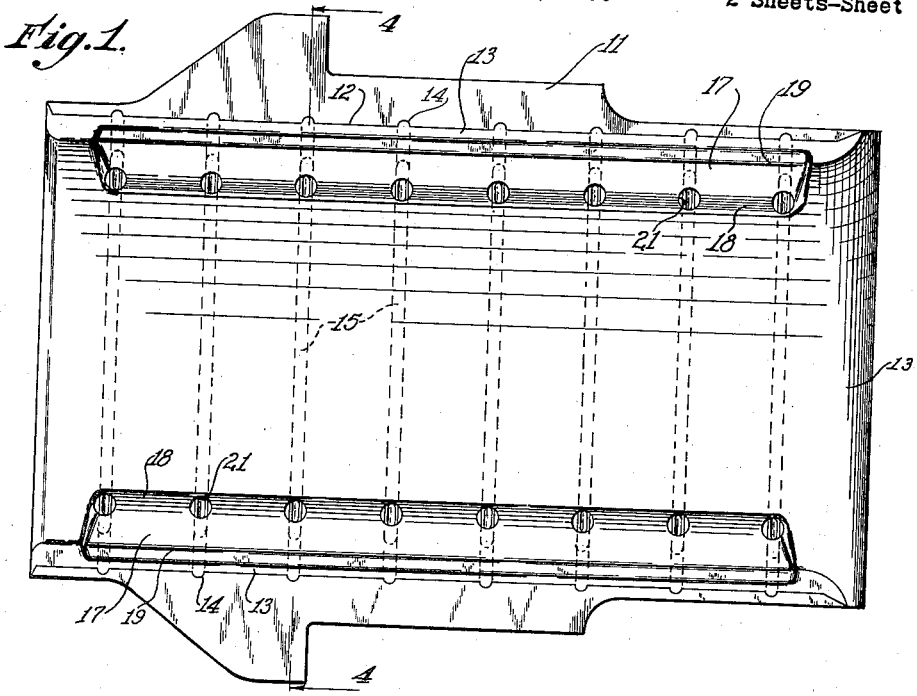
Figure 1 is a bottom plan view of a journal bearing embodying the invention.
Figure 2:
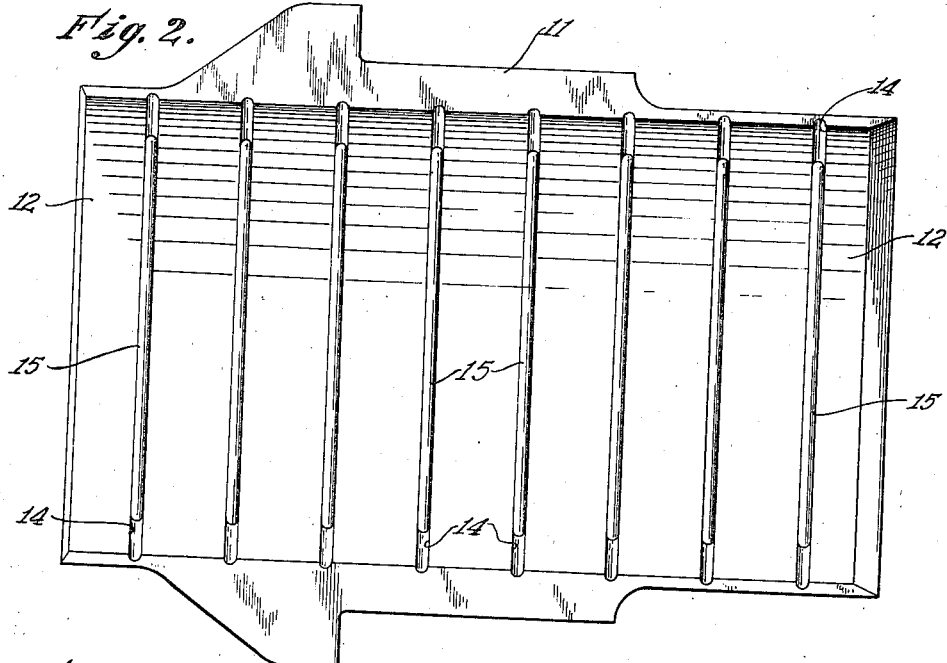
Fig. 2 is a view similar to Fig. 1, showing the bearing without the lining and the conduits mounted in the grooves on the concave surface of the body portion.

Referring more particularly to the drawings, reference numeral 11 indicates the body portion of a non-rotary member of a journal bearing, called the "brass," which may be of any suitable form. The body portion 11 is provided with a lower concave surface 12 to which is applied a lining 13 of Babbitt or other suitable material, which is applied in the usual manner to the surface 12 after it has been tinned or soldered so that it will adhere firmly thereto.

Figure 3:
Fig. 3 is a detail longitudinal sectional view of one of the conduits.

Formed in the lower surface 12 of the body portion 11, by machining or by being molded therein, are a plurality of transverse grooves or channels 14. Any desired number of these grooves may be provided and they are preferably spaced in parallel relationship to each other and extend completely across the lower surface 12. In each of these grooves 14 is positioned an arcuate conduit 15 which is preferably formed of metal tubing, such as copper, although any other suitable material, which is impervious to the action of the oil used for lubricating the bearing, and shape may be employed, and is completely enclosed, as shown in Fig. 3.

The conduits 15 may be positioned in the grooves 14 either before or after the surface 12 is tinned. The lining 13 is then molded or otherwise secured to the body portion 11 to maintain the conduits 15 in place. Those portions of the grooves 14 which are not filled by the conduits 15 will function as additional retaining means for the lining, since the lining will fill in such portions of the grooves, as will be seen in Figs. 1 and 4.

The lower surface of the lining 13 is formed to substantially conform to the upper portion of the usual journal 16 (shown in broken lines in Fig. 4) in a well-known manner. A pair of longitudinally extending grooves or channels 17 are machined or molded in this lower surface of the lining 13, and terminate short of the ends of the lining as best seen in Fig. 1, although they may be extended to either or both ends of the lining, if desired.

Figure 4:
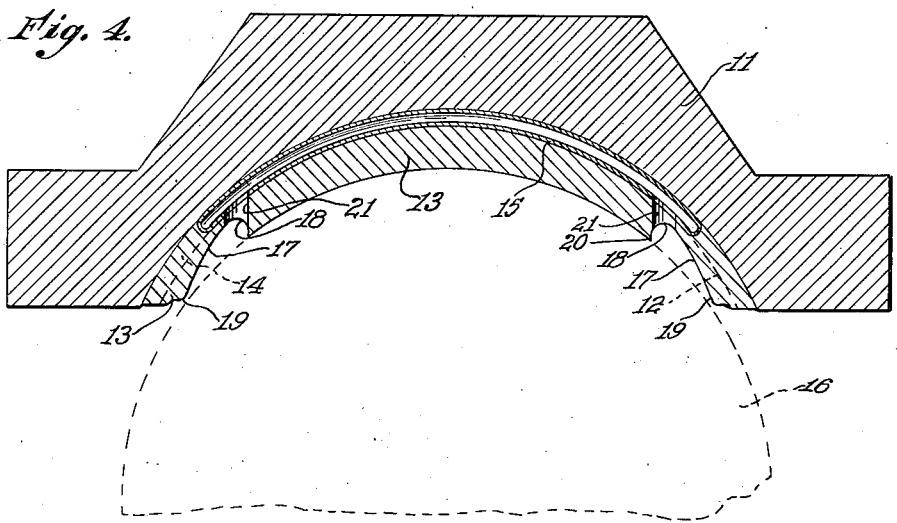
Fig. 4 is a vertical section taken substantially on the line 4—4 of Fig. 1.

Referring to Fig. 4, the channels 17 are curved in cross-section to provide a fish hook shaped inner surface, the deepest portion of which is at the upper part of the channel, as indicated at 18. The lower part of each of the channels 17 terminates at a point 19 which is spaced a short distance away from the outer surface of the journal 16. The bearing surface may be so shaped that contact between the journal and the bearing is confined to that portion of the bearing between the upper ends 20 of the channels 17. An aperture or bore 21 communicates between the upper portion 18 of each groove or channel 17 and each of the conduits 15. These bores 21 are preferably drilled through the lining 13 and into the conduits 15 as a final step in the manufacture of the bearing.

Figure 5:
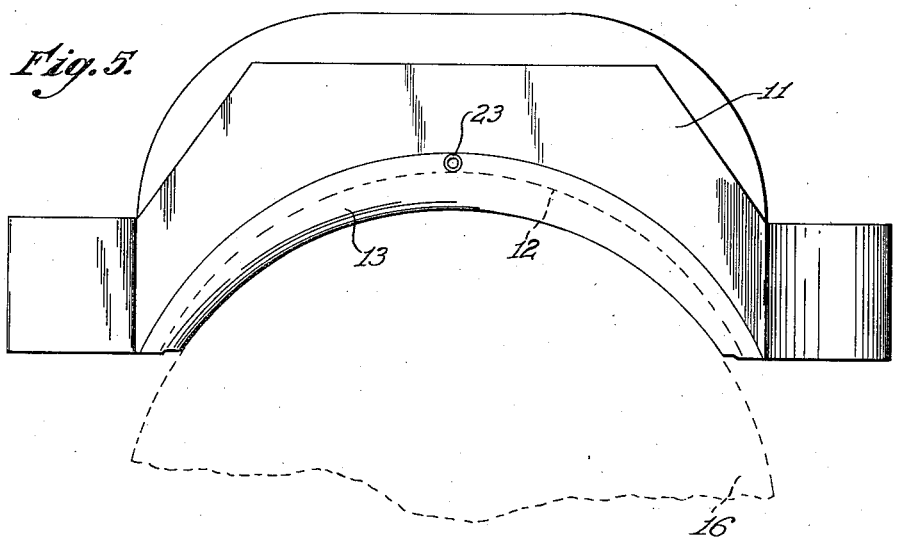
Fig. 5 is an end view of a modified form of bearing.
Figure 6:
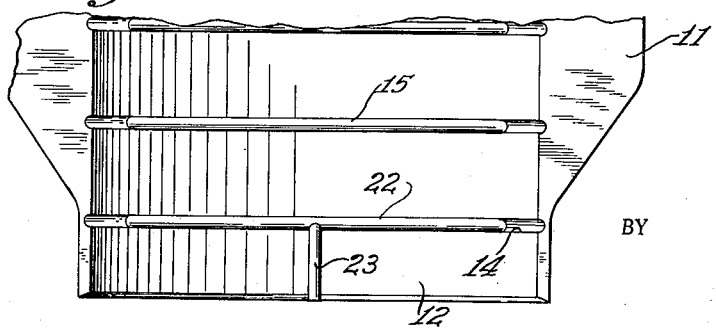
Fig. 6 is a bottom plan view with parts broken away, similar to Fig. 2, of the body portion of the bearing of Fig. 5.

The form of journal bearing shown in Figs. 5 and 6 is identical to that above described, except that one or more end conduits 22 are provided. These conduits are similar to the conduits 15 with the addition of a horizontally disposed extension 23 formed integrally therewith and extending at right angles to the main body from the mid-point thereof. The body portion 11 of the journal bearing is provided with a suitable longitudinal groove in each end of the upper part of the surface 12, which extends inwardly to the end groove 14. The extensions 23 of the end conduits 22 are adapted to lie in one of these longitudinal grooves, and terminate at their outer ends adjacent the end surface of the bearing member. The extension 23 is shown in Fig. 5 as being completely surrounded by the lining 13 only because the lining is rounded at that end and extends up above the lower surface 12 of the body portion 11, which latter surface is shown in dotted lines below the extension 23.

In this type of journal bearing lubricating oil is supplied to the outer surface of the journal in the usual manner by means of saturated waste disposed within the journal housing (not shown) and contacting the lower surface of the journal 16, although any other means of supplying a lubricant may be employed if desired.

Referring to that side of the journal 16 which is moving upward toward and under the bearing member during operation as the "inbound" side, and to the other side as the "outbound" side, the lubricating oil will be carried by the journal 16 into the channel 17 at the inbound side. The oil will be collected in the inbound channel 17 and be forced through the associated apertures 21 into the conduits 15, and thence into the channel 17 at the outbound side of the journal. This circulating action will effectively cool the bearing and assure uniform distribution of the oil.

The portion of the journal bearing most affected by overheating is the tinned or soldered surface 12 as the solder or other bond may become weakened or destroyed by heat. The circulation of the oil through the conduits 15 which are positioned directly adjacent the tinned surface 12, results not merely in the most effective cooling of this tinned surface, but substantially eliminates possibility of destroying the bond.

In addition, contact between the oil and the solder or other bond between the lining and the body of the bearing is substantially eliminated by the provision of separate conduits for the circulation of the oil, as above described. This is a further distinct advantage in view of the fact that one of the major reasons for failure of such journal bearings results from the deteriorating action of the oil on the bond employed between the body portion and the lining.

In the modification of Figs. 5 and 6 some of the oil which is forced through the end conduits 22 will flow through the extensions 23 to automatically lubricate the upper surface of the journals 16 exteriorly of and adjacent the journal bearing.

It will be readily apparent that the manufacture of these journal bearings will be greatly facilitated by the provision of the grooves 14 and the use of separate conduits 15. In the relining of the bearing, the removal of the Babbitt 13 by use of heat or the like will cause the conduits 15 to fall out of the grooves 14. The addition of a new lining to the body portion 11 will be a relatively simple matter as new and unpunctured conduits 15 may be used, and the problem of keeping the lining metal from clogging the conduits will not be presented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. A journal bearing comprising a brass having a concave surface, a plurality of transversely extending grooves in said surface, a copper tube in each of said grooves, a lining cast on said concave surface and securely attached to said brass, whereby said lining maintains said tubes in position and fills the portions of the grooves around the tubes to increase the mechanical strength of the bond between the lining and the brass, a longitudinal channel in each side of said lining, and apertures extending through said lining and connecting said tubes and said channels.

2. A journal bearing comprising a body having a concave surface, a plurality of transversely extending grooves in said surface, tubes in said grooves, and a lining cast on said concave surface and securely attached to said body, whereby said lining maintains said tubes in position and fills the portions of the grooves around the tubes to increase the mechanical strength of the joinder structure of the lining and body, said tubes being in communication with a source of lubricant near the sides of said lining by means of outlets in said lining connecting with the tubes.

3. A journal bearing of the type where lubricating oil is carried upwardly by the surface of the journal to the bearing, comprising a body having a concave surface, a plurality of transverse grooves in said surface, oil conductors in said grooves, a lining securely attached to said body and maintaining said conductors in position, and a longitudinal oil collecting channel at each side of said lining and connected with the interior of said conductors, whereby the oil is circulated through said conductors by said journal to cool the joinder structure of said body and said lining.

4. A journal bearing of the type where lubricating oil is carried upwardly by the surface of the journal to the bearing, comprising a brass having a bonded concave surface with a plurality of transversely extending grooves therein, a closed tube disposed in each of said grooves made of a material which is impervious to any deteriorating action of the oil, a lining cast on said bonded surface and thus securely attached to said brass to retain said tubes in place, a longitudinally extending channel in each side of the bearing surface of said lining, and apertures extending through said lining and said tubes to interconnect said tubes and said channels, whereby rotation of said journal will cause oil to flow through said bearing adjacent said bonded surface to cool the latter, while contact of the oil with said bonded surface will be substantially entirely eliminated.

5. A journal bearing of the type where lubricating oil is carried upwardly by the surface of the journal to the bearing, comprising a brass having a soldered concave surface with a plurality of transversely extending grooves therein, a closed copper tube disposed in each of said grooves, a bearing metal lining cast on said soldered surface and thus securely attached to said brass to retain said tubes in place, a longitudinally extending, oil collecting channel in each side of the bearing surface of said lining, and apertures extending through said lining and said tubes to interconnect said tubes and said channels, whereby rotation of said journal will cause oil to flow through said tubes adjacent said soldered surface to cool the latter, while contact of the oil with said soldered surface will be substantially entirely eliminated.

6. A journal bearing of the type where lubricating oil may have access to the end of the bearing, comprising a main body having a bonded concave surface with a transverse groove in said surface adjacent said end of the body, a closed tube disposed in said groove made of a material which is impervious to any deteriorating action of the oil, a bearing metal lining cast on said bonded surface and thus securely attached to said body to retain said tube in place, a longitudinally extending, oil collecting channel in each side of the bearing surface of said lining, and apertures extending through said lining and said tube to interconnect said tube and said channels, whereby lubricating oil will be caused to flow through said tube adjacent said bonded surface to cool the latter, and said tube will function as a dam to limit inward progression in a longitudinal direction of any deteriorating action on the bond by the oil which may come in contact with the end portion of the bearing.

GILBERT R. COLEMAN.